(12) United States Patent
Tissot et al.

(10) Patent No.: US 10,100,780 B2
(45) Date of Patent: Oct. 16, 2018

(54) NACELLE FOR AN AIRCRAFT TURBOJET ENGINE COMPRISING A SECONDARY NOZZLE SECTION WITH ROTARY DOORS

(71) Applicant: SAFRAN NACELLES, Gonfreville l'Orcher (FR)

(72) Inventors: Sarah Tissot, Bois d'Arcy (FR); Xavier Bouteiller, Deville les Rouen (FR); Olivier Kerbler, Antony (FR); Patrick Gonidec, Bretx (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 0 days.

(21) Appl. No.: 15/364,623

(22) Filed: Nov. 30, 2016

(65) Prior Publication Data

US 2017/0082064 A1    Mar. 23, 2017

Related U.S. Application Data

(63) Continuation of application No. PCT/FR2015/051323, filed on May 20, 2015.

(30) Foreign Application Priority Data

May 30, 2014   (FR) ...................................... 14 54927

(51) Int. Cl.
*F02K 1/72* (2006.01)
*F02K 1/09* (2006.01)
(Continued)

(52) U.S. Cl.
CPC .................. *F02K 1/72* (2013.01); *F02K 1/09* (2013.01); *F02K 1/1261* (2013.01); *F02K 3/04* (2013.01); *F02K 3/06* (2013.01); *F05D 2250/42* (2013.01)

(58) Field of Classification Search
CPC ..... F02K 1/70; F02K 1/72; F02K 1/09; F02K 1/1261; F02K 1/30; F02K 1/50; F02K 1/1207; F02K 1/763
See application file for complete search history.

(56) References Cited

U.S. PATENT DOCUMENTS 3,764,096 A    10/1973   Wright
2013/0167505 A1*   7/2013   Gormley .................. F02K 1/09
                                                              60/226.1

FOREIGN PATENT DOCUMENTS

EP    2433864    3/2012
EP    2730773    5/2014
(Continued)

OTHER PUBLICATIONS

International Search Report for International Application PCT/FR2015/051323, dated Aug. 28, 2015.

*Primary Examiner* — Gerald L Sung
*Assistant Examiner* — William Breazeal
(74) *Attorney, Agent, or Firm* — Burris Law, PLLC

(57) ABSTRACT

The present disclosure relates to a turbojet engine nacelle having an external cowling with an internal wall defining, with an internal fixed structure, an annular flow channel for a secondary airflow and an exhaust nozzle for said secondary airflow. The nozzle includes at least one opening, at least one continuous downstream end portion, downstream of said opening, and at least one door moving between a closed position and an open position allowing the passage of a part of said airflow through said opening. The nacelle is notable in that it includes a shaped device for activation of the door, during their activation from a closed position to an open position of the door, to drive the door in a combined movement that is translational in the direction running upstream from the nacelle and rotary towards the exterior of the nacelle.

9 Claims, 5 Drawing Sheets

(51) Int. Cl.
*F02K 1/12* (2006.01)
*F02K 3/04* (2006.01)
*F02K 3/06* (2006.01)

(56) References Cited

FOREIGN PATENT DOCUMENTS

| | | | | |
|---|---|---|---|---|
| FR | 2622929 | 5/1989 | | |
| WO | 2008/003889 | 1/2008 | | |
| WO | 2013/021108 | 2/2013 | | |
| WO | WO2013/021108 | * 2/2013 | ............... | F02K 1/06 |
| WO | 2015/052457 | 4/2015 | | |

* cited by examiner

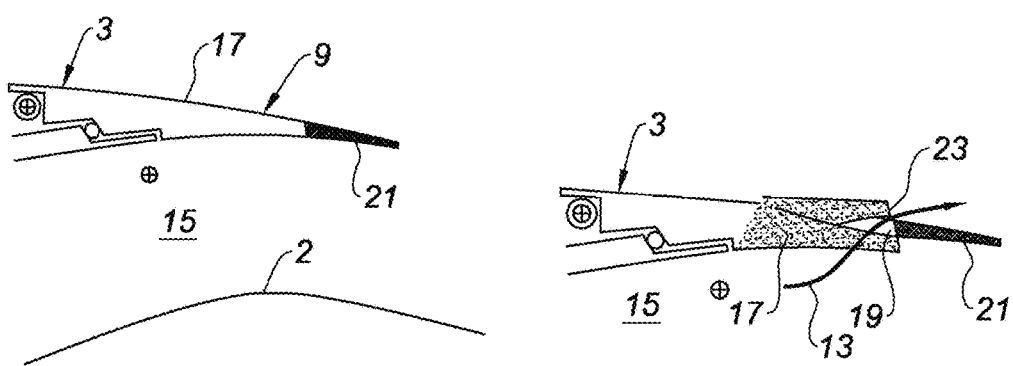
Fig. 2
_PRIOR ART_

NACELLE FOR AN AIRCRAFT TURBOJET ENGINE COMPRISING A SECONDARY NOZZLE SECTION WITH ROTARY DOORS

CROSS-REFERENCE TO RELATED APPLICATIONS

This application is a continuation of International Application No. PCT/FR2015/051323, filed on May 20, 2015, which claims the benefit of FR 14/54927, filed on May 30, 2014. The disclosures of the above applications are incorporated herein by reference.

FIELD

The present disclosure relates to a nacelle for an aircraft turbojet engine comprising a nozzle with downstream doors.

BACKGROUND

The statements in this section merely provide background information related to the present disclosure and may not constitute prior art.

An aircraft is moved by several turbojet engines each housed in a nacelle.

A nacelle generally has a tubular structure comprising an air inlet upstream of the turbojet engine, a middle section intended to surround a fan of the turbojet engine, a downstream section accommodating a thrust reverser device and intended to surround the combustion chamber of the turbojet engine, and is generally ended by an ejection nozzle whose outlet is located downstream of the turbojet engine.

This nacelle is intended to accommodate a bypass turbojet engine able to generate through the blades of the rotating fan a hot air flow (also called primary flow), coming from the combustion chamber of the turbojet engine, and a cold air flow (secondary flow) which circulates outside the turbojet engine through an annular channel, also called flow path, formed between a fairing of the turbojet engine and an inner wall of the nacelle. The two air flows are ejected from the turbojet through the back of the nacelle.

The thrust reverser device is, during the landing of the aircraft, intended to improve the braking capacity thereof by redirecting forwards at least one portion of the thrust generated by the turbojet engine.

In this phase, the thrust reverser device obstructs the flow path of the cold air flow and directs the latter towards the front of the nacelle, thereby generating a counter-thrust which is added to the braking of the wheels of the aircraft, the means implemented to perform this reorientation of the cold air flow vary depending on the type of thrust reverser.

The means implemented to achieve this reorientation of the cold air flow vary depending on the thrust reverser type. However, the structure of a thrust reverser generally comprises movable cowls displaceable between, on the one hand, a deployed position in which they open within the nacelle a passage intended to the diverted flow, and on the other hand, a retracted position in which they close this passage. These cowls may fulfill a function of deflection or simply of activation of other diverting means.

Furthermore, besides its thrust reversal function, the thrust reverser cowl belongs to the downstream section of the nacelle and has a downstream portion forming the ejection nozzle aiming to channel the ejection of the air flows.

The optimal section of the ejection nozzle can be adapted depending on the different flight phases, namely the take-off, climb, cruise, descent and landing phases of the aircraft. The advantages already well known of such adaptive nozzles, also called variable section nozzles, are in particular the reduction of noise or the decrease of fuel consumption.

Among the variable section nozzles according to the prior art, the one described in the patent application published under the number FR 2 622 929, an embodiment of which is represented in FIG. 1, is in particular known. This application relates to a nacelle 1 for a turbojet engine, comprising an inner fixed structure 2 and an outer cowling 3 comprising an upstream section 5 and a downstream section 7 comprising a variable geometry nozzle 9.

A ring 10 of the downstream section of the outer cowling 3 is slidably mounted axially so as to create an opening 11 in the outer cowling 3. This opening 11 allows a portion of the air flow 13 circulating in the annular channel 15 to be ejected, which leads to enlarge the section of the nozzle formed by the cowl.

Although this type of nacelle allows effectively varying the section of the nozzle, it has some drawbacks.

The mechanical link between the upstream section 5 and the downstream section 7 of the outer cowling 3 constitutes a mechanical weakening of the nacelle.

Besides weakening the thrust reverser cowl, this mechanical link may also generate vibrations of the annular downstream section of the cowl during the operation of the engine.

It is also known from the prior art, the variable geometry nozzle 9 described in the patent application published under the number FR 2 946 696, represented in FIG. 2, in which the variation of the output section is made through doors 17 movably mounted in rotation between a position according to which they close an opening 19 of the outer cowling 3 and a position according to which they release said opening so as to eject a portion of the secondary air flow 13 to the outside of the nacelle and, consequently, to increase or reduce the output section of the nacelle.

As represented, this variable geometry nozzle 9 comprises a continuous downstream end portion 21, downstream of the opening 19 and the doors 17, which allows substantially increasing the structural strength of the nacelle, and solving the drawbacks of the prior art.

However, for a significant opening of the door, that is to say for a pivoting of the door 17 important enough (position which is not represented) to allow the passage of a sufficient amount of secondary air flow coming from the annular channel 15, the air flow which passes through the opening of the outer cowling and which escapes from the nacelle diverges, and is directed in a direction quasi-transverse to the longitudinal axis of the nacelle.

Such divergence of the air flow greatly affects the aerodynamic profile of the nacelle, and deteriorates the thrust performances of the propulsion assembly.

Furthermore, the doors of this nozzle have a relatively large and planar trailing edge 23, which results in a base-drag phenomenon, also affecting the aerodynamic profile of the nacelle and limiting the performances of the nozzle.

SUMMARY

The present disclosure relates to a nacelle for an aircraft turbojet engine comprising:
an inner fixed structure defining at least partially a fairing of a turbojet engine,
an outer cowling comprising an upstream section and a downstream section, said downstream section comprising an outer wall and an inner wall defining, with the inner fixed structure, an annular flow channel of a secondary air flow, said downstream section comprising an ejection nozzle of said secondary air flow, said nozzle comprising:

at least one opening defined in the downstream section of the outer cowling, at least one continuous downstream end portion, downstream of said opening, at least one door, acoustically treated or not, alternately movable, upon activation of actuating means, between a closed position closing said opening and providing an aerodynamic continuity of the nacelle, and an open position allowing the passage of at least one portion of the secondary air flow through said opening, from the annular channel toward the outside of the nacelle, said nacelle being remarkable in that the actuating means are shaped, upon activation of said means from a closed position to an open position of the door, in order to drive said door into a combined movement in translation upstream of the nacelle and in rotation toward the outside of the nacelle.

Thus, by providing for actuating means shaped to drive a secondary nozzle door both in translation upstream of the nacelle and in rotation toward the outside of the nacelle, the opening width of the door is limited while satisfying the variation requirements of the output section of the nozzle.

In other words, such an opening kinematics of the door allows displacing the door in a position which allows redirecting the secondary air flow escaping from the opening of the nacelle to the downstream of the nacelle, in the direction of the longitudinal axis of the nacelle, along the outer wall of the outer cowling of the nacelle.

Thanks to these kinematics, the rotation angle of the door remains modest; the divergence of the air flow which escapes from the opening is thus limited relative to the prior art, which allows substantially controlling and improving the aerodynamic performance of the nacelle.

Thus, by making convergent the secondary air flow escaping from the opening provided in the outer cowling of the nacelle, the thrust performances of the propulsion assembly are improved.

According to optional features of the nacelle according to the present disclosure:

the actuating means/device comprises:

at least one actuator comprising an upstream body secured to a fixed portion of the nacelle, and a rod whose one end is directly connected to an upstream wall of said door, and at least one connecting rod whose one end is connected to the outer cowling of the nacelle and the other end is connected to the door of the nozzle.

the door comprises a trailing edge shaped to cover at least partially the continuous downstream end portion of the nozzle, which allows defining an aerodynamic continuity of the inner wall and the outer wall of the nacelle at the area between the door and the continuous downstream end portion of the nozzle;

the trailing edge of the door has a curved profile, which allows improving the convergence of the air flow ejected towards the longitudinal axis of the nacelle; the trailing edge of the door has a tapered profile such that a tangent to the lower surface of the door is substantially parallel to the wall of the continuous downstream end portion positioned opposite to the trailing edge of the door, which allows channeling the secondary air flow in a direction substantially parallel to the longitudinal axis of the nacelle, which allows improving the thrust of the propulsion assembly;

sealing means/device is disposed between the door and the outer cowling, and is arranged to oppose the flow of the air on the perimeter of the door and through the opening when the door is in closed position, which allows inhibiting the air circulating in the annular channel from flowing through the door and the associated opening when the door is in closed position;

the door or the outer cowling further comprises at least one fixed or movable lateral flap near the opening;

the upstream section of the outer cowling and the continuous downstream end portion of the nozzle are made in one single piece, which provides a good structural strength of the nacelle;

the door in closed position allows the passage of a controlled leakage rate in the channel in order to obtain a nacelle drag gain;

the nozzle comprises a plurality of openings which are circularly distributed about a longitudinal axis of the nacelle and which are each closed by a door when said door is in its closed position;

the door can be acoustically treated;

a thrust reverser device, equips the nacelle according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 represents a longitudinal section of a nacelle according to the prior art equipped with a variable geometry nozzle in which the variation of the output section of the nozzle is performed through doors movable in rotation;

Figure 3:
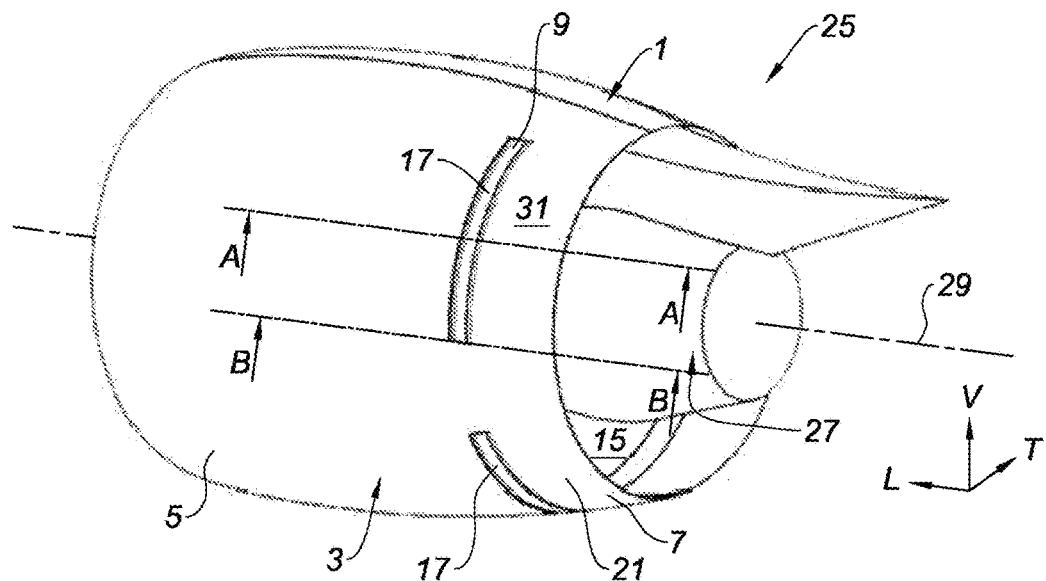
FIG. 3 is an isometric view which illustrates a propulsion assembly comprising a nacelle according to the present disclosure surrounding an aircraft turbojet engine.
Figure 12:
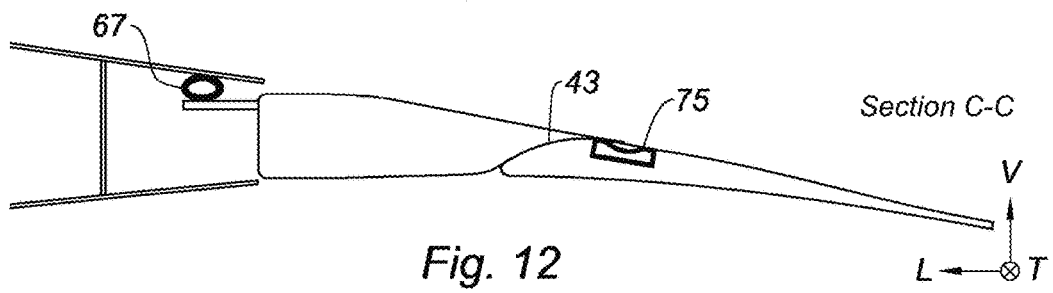
Figure 13:
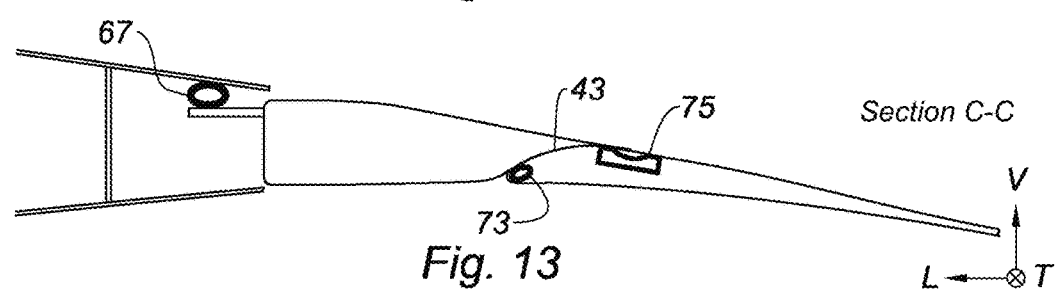
Figure 14:
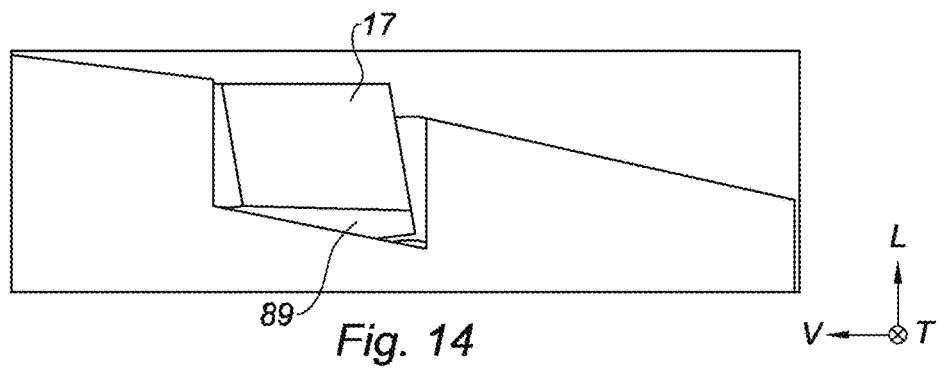

FIGS. 10 to 13 illustrate the nacelle in longitudinal section along the line A-A of FIG. 3, on which are represented four variants of the sealing means/device provided between the door and the outer cowling of the nacelle; and FIG. 14 is a view centered on the door of the nozzle equipping the nacelle according to the present disclosure, the door being represented in a closed position and being provided with a lateral flap.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is to be noted that in the description and in the claims, the terms "upstream" and "downstream" should be understood relative to the circulation of the air flow inside the propulsion assembly formed by the nacelle and the turbojet engine, that is to say from the left to the right with reference to FIGS. 1 to 14.

Similarly, the expressions "inner" and "outer" are used, without limitation, with reference to the radial distance relative to the longitudinal axis of the nacelle, the expression "inner" defining an area radially closer to the longitudinal axis of the nacelle, opposed to the expression "outer."

Moreover, in the description and the claims, in order to clarify the description and the claims, the longitudinal, vertical and transverse terminology will be adopted, without limitation, with reference to the direct trihedron L, V, T indicated in the figures, whose longitudinal axis L is parallel to the longitudinal axis 29 of the nacelle represented in FIG. 3.

Furthermore, in all the figures, identical or similar references represent identical or similar members or sets of members.

Referring to FIG. 3, on which a propulsion assembly 25 comprising a nacelle 1 according to the present disclosure surrounding a turbojet engine 27 is represented.

The nacelle 1 is intended to be suspended on an engine pylon (not represented) through a fastening island (not represented) forming a link interface.

The nacelle 1 comprises an outer cowling 3 comprising an upstream section 5 and a downstream section 7 comprising a variable geometry ejection nozzle 9 of a portion of the secondary air flow circulating in an annular channel 15 defined between the inner fixed structure of the nacelle and the inner wall of the outer cowling.

The variable geometry nozzle 9 comprises a plurality of openings 19 (one of which is visible in FIG. 9), for example four (only two openings are visible in FIG. 3), circularly distributed around a longitudinal axis 29 of the nacelle.

Of course, the nozzle can absolutely comprise more than four openings, for example six. It may also (on small diameter nacelles) comprise only two or three openings.

These openings have each a shape of an open slot radially outwards 31 of the nacelle 1, and define a passage between the annular circulation channel 15 of the secondary air flow and the outside 31 of the nacelle.

These openings are each closed by a door 17 alternately movable between a closed position closing its associated opening 19 and an open position allowing the passage through said opening 19 of at least one portion of the secondary air flow, from the annular channel 15 toward the outside 31 of the nacelle.

In order not to burden the description, only an assembly consisting of an opening 19 and an associated door 17 is described in detail hereinafter, the openings 19 and the associated doors 17 are all similar.

Downstream of these openings, the variable geometry nozzle 9 has a continuous downstream end portion 21, made in one single piece with the upstream section 5 of the outer cowling 3. In other words, the assembly of the outer cowling 3, further comprising the upstream section 5 and the continuous downstream end portion 21, is made in one single piece, and the openings 19 are made in this outer cowling.

Figure 4:
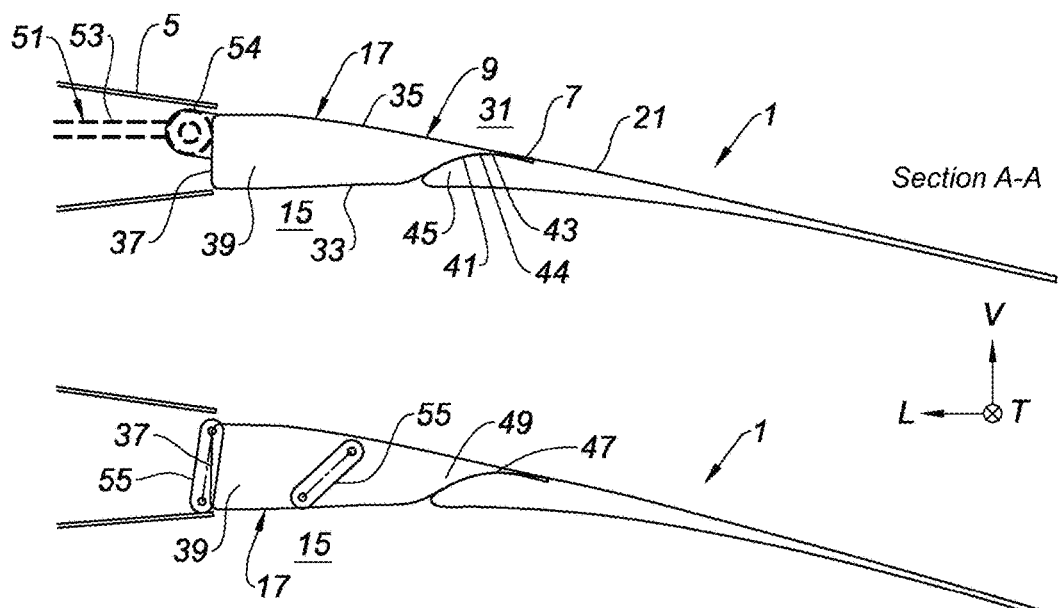
FIG. 4 represents the nacelle in longitudinal section along the lines A-A and B-B of FIG. 3, the door being represented in closed position.

With reference to FIG. 4 illustrating the nacelle 1 seen in longitudinal section along planes respectively passing through the lines A-A and B-B of FIG. 3, the door 17 being represented in closed position.

The door 17 comprises an inner wall 33 and an outer wall 35.

The inner 33 and outer 35 walls are immovable relative to each other, which simplifies the design relative to a door comprising an inner skin and a outer skin movable relative to each other.

The inner and outer walls of the door are structurally linked together by an upstream wall 37, two side walls 39 and a downstream wall 41 defining a trailing edge 43 of the door 17. This structure may obviously be reinforced by stringers or inner frames according to the practices known by those skilled in the art. The door 17 can receive an acoustic treatment, for example of sandwich-type. On thin lines, this sandwich can advantageously fill the whole inside of the structure between the walls 33 and 35.

When the door 17 occupies its closed position, the inner wall 33 of the door provides an inner aerodynamic continuity of the nacelle, in order not to disturb the flow of the air flow in the annular channel 15, and the outer wall 35 of the door provides the outer aerodynamic continuity of the fairing of the nacelle.

The aerodynamic continuity of the inner wall as well as of the outer wall of the cowling of the nacelle, is provided at the junction between the trailing edge 43 of the door and the downstream end portion 21 of the nozzle, thanks to a particular profile of the trailing edge. To this end, the trailing edge 43 of the door has a curved profile 44 advantageously covering an upstream portion 45 of the continuous downstream end portion 21 of the nozzle.

The trailing edge 43 has a lower surface comprising a downstream portion 47 of a reduced thickness relative to an upstream portion 49 of said trailing edge.

The trailing edge 43 has a tapered profile such that a tangent to the lower surface of the door 17 is substantially parallel to the wall of the downstream end portion 21 positioned opposite the trailing edge of the door.

In other words, the trailing edge 43 is located in the extension of an outer wall of the outer cowling of the nacelle so as to define an aerodynamic continuity of the outer cowling of the nacelle.

The door 17 is further likely to be moved by a cylinder-type actuator 51 comprising an upstream body (not represented) secured to a fixed portion of the nacelle, for example the outer cowling of the nacelle, and an actuating rod 53, whose one free end is directly connected to the upstream wall 37 of the door 17. This type of actuator, for example electric actuator, is well known to those skilled in the art and therefore will not be further described.

The rod 53 of the actuator 51 is slidably mounted longitudinally in the associated body along an axis substantially parallel to the longitudinal axis of the nacelle, and the door 17 is pivotally mounted on the end 54 of the rod 53 of the actuator 51.

A single actuator is sufficient for the displacement of a door. However, if those skilled in the art find a particular interest therein, several actuators 51 can be connected to the door 17. Alternatively, a single actuator 51 connected to a movement return device drives a plurality of doors in movement.

The door 17 is further connected to the outer cowling of the nacelle thanks to connecting rods 55 mounted on the lateral walls 39 of the door 17.

Each lateral wall 39 of the door 17 receives two connecting rods 55, the first one of which is mounted near the upstream wall 37 of the door, and the second one of which is mounted downstream of the first one.

The disposition of the connecting rods is optimized depending on the kinematics and their structural efficiency. The connecting rods 55 are almost tangent to the inner wall or to the outer wall of the door. This disposition allows better transmitting the forces of the door 17 to the outer cowling 3.

Figure 5:
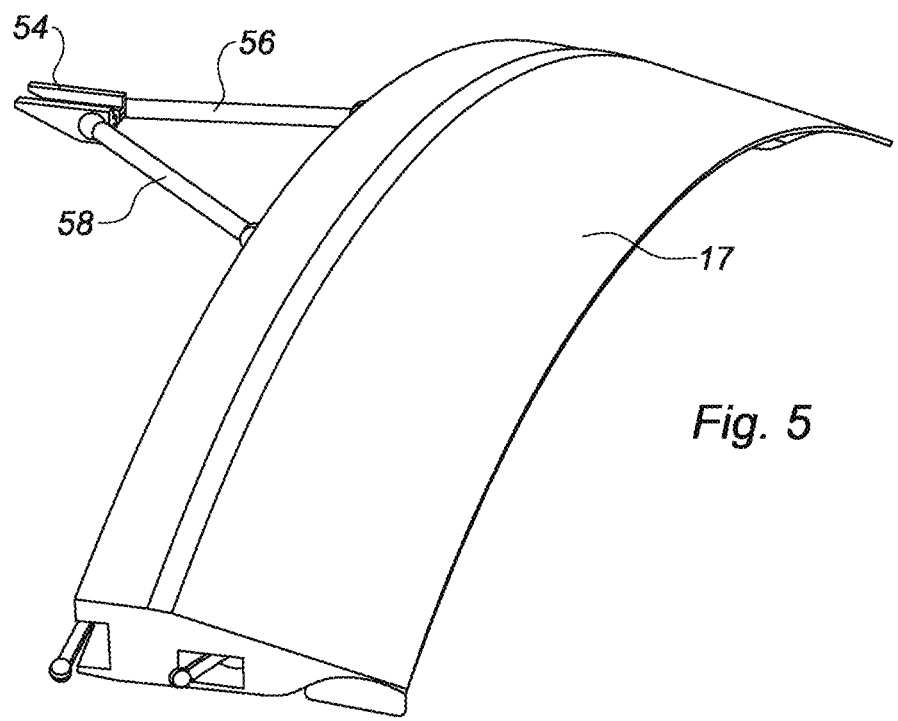
FIG. 5 is an isometric view of the door, illustrating a variant of the link between the actuator and the door.

According to a variant represented in FIG. 5, the end 54 of the rod of the actuator (not represented) can be connected to the door 17 by two connecting rods 56, 58 positioned in the continuity of the actuator and forming a "V," allowing stabilizing the movement of the door 17 and limiting a torsion of the door.

Figure 6:
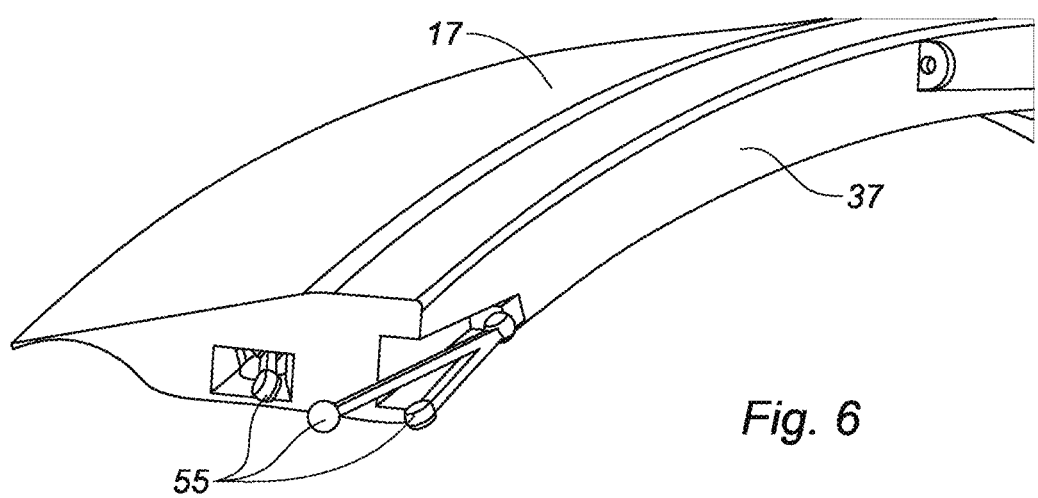
FIG. 6 is an isometric view of the door, centered on its lateral wall, illustrating a link mode between the door and the fixed structure of the nacelle.

According to another variant represented in FIG. 6, each lateral wall of the door receives three connecting rods 55. According to this form, two connecting rods forming a "V" are mounted near the upstream wall 37 of the door, and a connecting rod is mounted downstream of the connecting rods forming a "V." This form allows good stabilization of the movement of the door.

Figure 7:
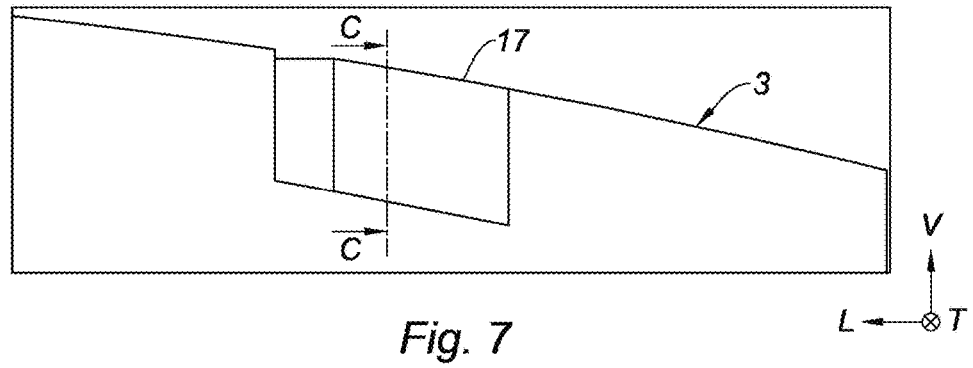
FIG. 7 is a view centered on the door of the nozzle equipping the nacelle according to the present disclosure, the door being represented in closed position.
Figure 8:
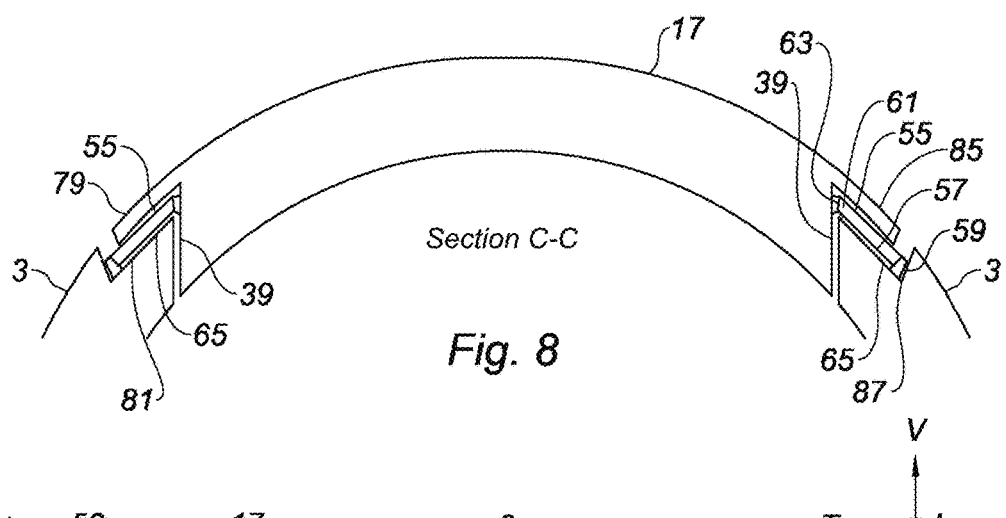
FIG. 8 is a cross-sectional view along the line C-C of FIG. 7.

As represented with more detail in FIGS. 7 and 8, to which reference is now made, the connecting rods 55 are substantially tangent to the lateral walls 79 of the door, a first end 57 of the connecting rod 55 is connected to the outer cowling 3 of the nacelle through a link 59, and a second end 61 of the connecting rod 55 is connected to the lateral wall 39 of the door 17 through a link 63.

The door 17 may advantageously be equipped with a lateral sealing means/device provided between the door 17 and the opening 19 associated with the outer cowling 3, in order to inhibit the lateral, or transverse air leakage, that is to say along a direction perpendicular to the longitudinal axis of the nacelle, between the door 17 and the associated opening 19, when the door 17 occupies its closed position.

The lateral sealing means/device in one form comprises a first lateral seal (not represented) interposed between a first longitudinal lateral edge 79 of the door 17 and a first complementary longitudinal lateral edge 81 of the outer wall 65 of the outer cowling 3.

By symmetry, the lateral sealing means/device comprises a second lateral seal (not represented) interposed between a second longitudinal lateral edge 85 of the door 17 and a second complementary longitudinal lateral edge 87 of the outer wall 65 of the outer cowling 3.

Figure 9:
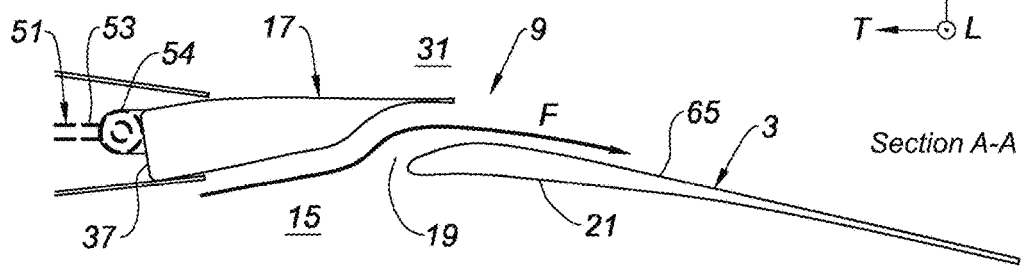
FIG. 9 represents the nacelle in longitudinal section along the lines A-A and B-B of FIG. 3, the door being represented in an open position.
Figure 9:
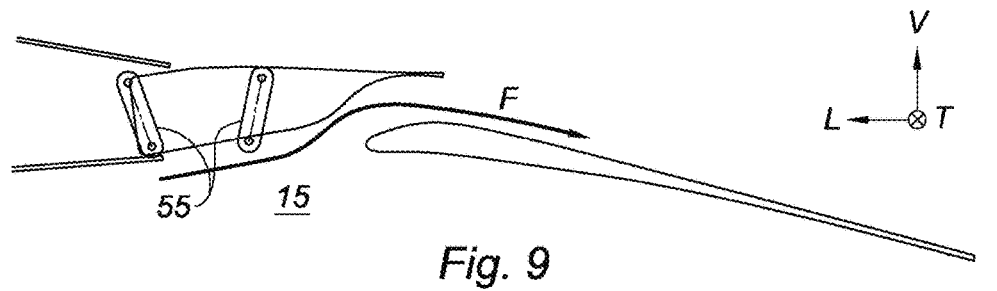

The passage of a door from its closed position represented in FIG. 4 to its open position represented in FIG. 9 is described hereinafter.

The actuator 51 is activated so as to cause a translation upstream of the nacelle of the rod 53, whose end 54 is connected to the upstream wall 37 of the door 17.

Simultaneously with the translation movement of the door to the upstream of the nacelle, the connecting rods 55, connected to door 17 and to outer cowling of the nacelle, being fixed, causes in concert the rotation of the door 17 to the outside 31 of the nacelle.

The door 17 moves in one single piece, that is to say, the inner 33 and outer 35 walls of the door pivot about a same instantaneous rotation axis, parallel to an axis connecting the attachment points 59 of the connecting rods on the outer cowling 3 on either side of the nacelle.

The door 17 is then located in an open position, allowing an escape of a portion of the secondary air flow flowing from the secondary flow to the outside of the nacelle through the opening 19, as schematically represented by the arrow F, and the output section of the secondary nozzle is thus increased.

Thanks to the particular door opening kinematics which has just been described, according to which the door is both driven in upstream translation and in rotation, the air flow passing through the opening 19 of the nozzle is advantageously projected downstream of the nacelle, in the direction of the longitudinal axis of the nacelle, along an outer wall 65 of the outer cowling 3 of the nacelle, which allows providing the convergence of the air flow which escapes from the opening 19, and substantially controlling and improving the aerodynamic performance of the nacelle.

Furthermore, the curved profile 44 of the trailing edge 43 of the door 17 also improves the convergence of the air flow ejected to the longitudinal axis of the nacelle.

Figure 1:
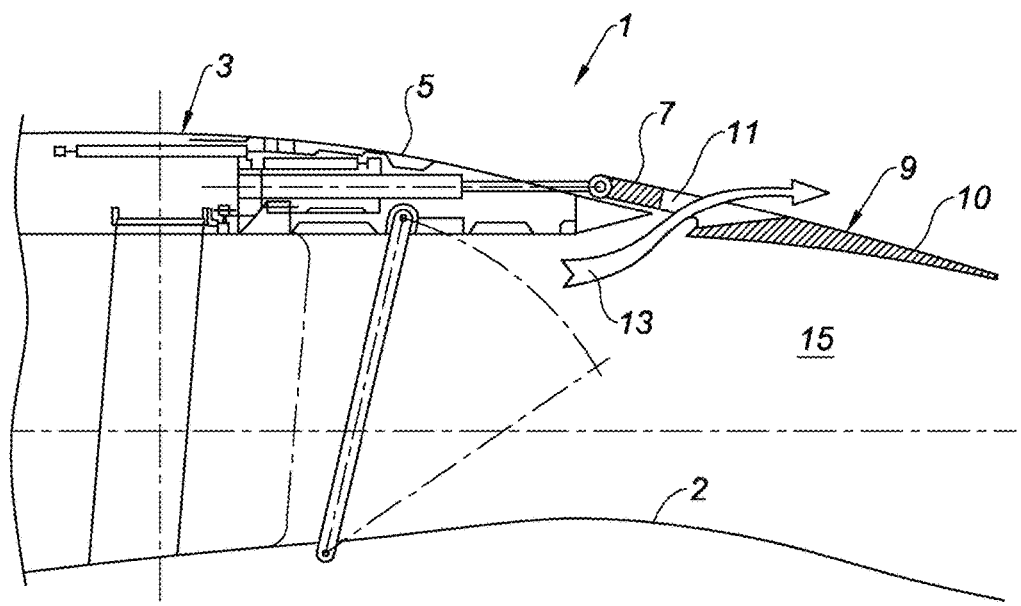
FIG. 1 illustrates in longitudinal section of a nacelle of the prior art, comprising a variable geometry nozzle comprising a downstream ring movable in translation.

Reference now is made to FIGS. 10 to 13 illustrating the nacelle in longitudinal section along the line A-A of FIG. 1, on which are represented four variants of sealing means disposed between the door 17 and the outer cowling 3 of the nacelle in order to inhibit the air circulating in the annular channel 15 from flowing through the door 17 and the associated opening 19 when the door 17 is in closed position.

Figure 10:
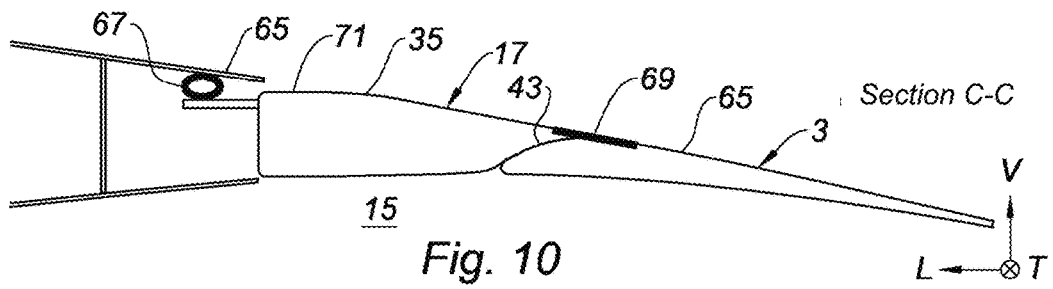

Referring to FIG. 10, the door 17 is equipped with an upstream seal 67 and a downstream seal 69, both formed of elastomeric material, forming the sealing means/device between the door 17 and the associated opening 19 of the outer cowling 3, when the door 17 occupies its closed position.

To this end, the upstream seal 67, for example bubble or lip seal, is interposed between an upstream end portion 71 of the outer wall 35 of the door 17 and the outer wall 65 of the outer cowling 3. The upstream seal 67 may indifferently be supported by the door 17 or by the outer cowling 3.

Similarly, the downstream seal 69, for example flat seal, is interposed between the outer wall 35 of the door and the outer wall 65 of the outer cowling. The downstream seal 69 is supported by the door 17 so as not to disturb the flow upon the opening thereof.

Alternatively, the seal 69 comprises reinforcements arranged so as to allow a straightening of the seal towards the inner face of the door upon its opening. This allows a good redirection of the air flowing at the trailing edge 43 of the door while providing for a tapered profile of the trailing edge.

In this form, the seal 69 is then forced by elasticity to align with the outer skin of the continuous downstream end portion 21 when the door moves from its open position to its closed position. The seal advantageously constitutes an excellent aerodynamic smoothing seal of the junction area between the door 17 and the continuous downstream end portion 21.

Figure 11:
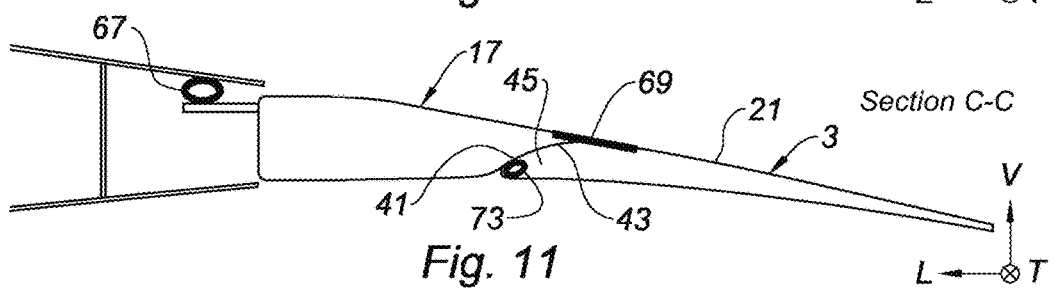

Referring to FIG. 11, the sealing of the door 17 is provided, on the one hand, by the previously described seals 67 and 69 and, on the other hand, by a second downstream seal 73, also formed of an elastomeric material, for example, bubble or lip material, interposed between the downstream wall 41 of the door 17 and the upstream portion 45 of the continuous downstream end portion 21 of the nozzle of the outer cowling 3.

Referring to FIG. 12, the sealing of the door 17 is provided, on the one hand, by the seal 67 and, on the other hand, by a downstream seal 75 formed of an elastomeric material.

The downstream seal 75 is integrated in the wall of the continuous downstream end portion 21 so as to limit the aerodynamic disturbance when the door is open, and to accommodate the shape of the trailing edge 43 of the door when the latter sinks into the seal 75 when the door 17 is in closed position. The downstream seal 75 can equally be supported by the door 17 or by the outer cowling 3 by adapting its shape to these two different cases.

Finally, referring to FIG. 13, the sealing of the door 17 is provided by the upstream 67 and downstream 73 and 75 seals.

The downstream seal 75 is advantageously prestressed when the door 17 is in closed position and is deformed inwardly upon the opening of the door in order to align the secondary air flow passing through the opening 19 as parallel as possible to the outer wall 65 of the downstream end portion 21 of the outer cowling 3, while reducing the base drag at the trailing edge 43 of the door 17 when said door is in open position.

According to a non represented alternative form, no sealing means/device is provided between the trailing edge 43 of the door 17 and the continuous downstream end portion 21. In this case, contact points adapted in terms of stiffness and thickness are arranged between these two parts or at the interface of the door and of the outer cowling. The channel obtained in this configuration is advantageously convergent and receives the boundary layer of the secondary flow in order to accelerate the outer boundary layer along the afterbody, thus contributing to decreasing the drag of the nacelle.

Furthermore, in order to inhibit air from flowing through the sides of the door 17, the door 17 may advantageously comprise rigid lateral flaps 89 arranged on either side of the door 17, as shown in FIG. 14.

A device of movable lateral flaps connected to the door by ball-joint connections may however replace the rigid lateral flaps 89 fastened on the door.

The aforementioned flaps contribute to an axial flow of the secondary air flow passing through the opening 19 downstream of the nacelle, which allows improving the thrust performances of the propulsion assembly.

According to an alternative which is not represented in the figures, the lateral flaps are supported not by the door itself but by the outer cowling.

As before, it may be planned to connect these lateral flaps to the outer cowling via ball-joint connections so that the lateral flaps are located in a closed position in which they are folded over the door when the door is located in a closed position, and are located in an open position according to which the flaps are deployed along lateral walls of the door when the door moves from its closed position to its open position.

According to yet another alternative, the lateral flaps are both supported by the door and the outer cowling, which allows benefitting from a smooth aerodynamic surface when the door is in closed position and to inhibit divergent jets when the door is in open position.

It should be noted that the description has been made in relation to a smooth nacelle, that is to say non-equipped with a thrust reverser device.

However, the nozzle according to the present disclosure can equip a nacelle provided with any type of secondary flow thrust reversal means, with cascades or doors.

Such thrust reverser devices are well known to those skilled in the art and will not be further described in the present description.

In this case, the doors of the nozzle are positioned downstream of the cascades and/or doors of the thrust reverser. When the nacelle is equipped with thrust reversal means, the actuators of the doors of the nozzle and the thrust reverser cowl(s) can be common, or segregated.

The upstream body of an actuator is mounted on the body 3 surrounding the door 17.

In addition, the primary locks are shaped to inhibit a deployment of the thrust reverser regardless of the position of the doors 17.

Thanks to the present disclosure, by providing an actuating means/device shaped to drive a secondary nozzle door both in translation upstream of the nacelle and in rotation outwardly of the nacelle, the opening amplitude of the door is limited while satisfying the variation requirements of the output section of the nozzle.

In other words, such an opening kinematics of the door allows displacing the door in a position which allows redirecting the secondary air flow escaping from the opening of the nacelle downstream of the nacelle, in the direction of the longitudinal axis of the nacelle, along the outer wall of the outer cowling of the nacelle.

The divergence of the air flow which escapes from the opening is thus limited as compared to the prior art, which allows controlling and substantially improving the aerodynamic performance of the nacelle.

Thus, by making convergent the secondary air flow which escapes from the opening provided in the outer cowling of the nacelle, the thrust performances of the propulsion assembly are improved.

Furthermore, the continuous downstream end portion of the nozzle allows substantially increasing the structural strength of the nacelle.

Finally, the present disclosure is obviously not limited only to the sole forms of this nacelle described above by way of illustrative examples only, but it encompasses, on the contrary, all the variants involving technical equivalents of the means described as well as their combinations if these fall within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine comprising: an inner fixed structure defining at least partially a fairing of the aircraft turbojet engine;
   an outer cowling comprising an upstream section and a downstream section, said downstream section comprising an outer wall and an inner wall defining, with the inner fixed structure, an annular flow channel of an air flow, said downstream section comprising an ejection nozzle of said air flow, said ejection nozzle comprising:
   at least one opening in the downstream section of the outer cowling;
   at least one continuous downstream end portion, downstream of said at least one opening;
   at least one door alternately movable, upon activation of an actuating device, between a dosed position sealing said at least one opening and providing aerodynamic continuity of the nacelle, and an open position allowing passage of at least one portion of the air flow through said at least one opening, from the annular flow channel towards an outside of the nacelle, wherein the at least one door comprises a door inner wall and a door outer wall, wherein the door inner wall and the door outer wall are immovable relative to each other, and wherein when the door is in the closed position, the door inner wall provides inner aerodynamic continuity of the nacelle and the door outer wall provides outer aerodynamic continuity of the nacelle, wherein the actuating device, upon activation of said actuating device from the closed position to the open position of the at least one door, is operable to drive said at least one door into a simultaneous combined movement in translation upstream of the nacelle and in rotation outwardly of the nacelle, wherein the entire at least one door translates upstream during the simultaneous combined movement, and in that the actuating device comprises:

at least one actuator comprising an upstream body secured to a fixed portion of the nacelle, and a rod having one end directly connected to an upstream wall of said at least one door; and at least one connecting rod having an end connected to the outer cowling of the nacelle and another end of which is connected to the at least one door of the ejection nozzle, wherein when the at least one door is translated, the at least one connecting rod is also translated and causes simultaneous rotation of the at least one door.

2. The nacelle according to claim 1, wherein the at least one door comprises a trailing edge shaped to at least partially cover the at least one continuous downstream end portion of the ejection nozzle.

3. The nacelle according to claim 2, wherein the trailing edge of the at least one door has a curved profile.

4. The nacelle according to claim 2, wherein the trailing edge of the at least one door has a tapered profile such that a tangent to a lower surface of the at least one door is parallel to a wall of the continuous downstream end portion positioned opposite said trailing edge.

5. The nacelle according to claim 1 further comprising a sealing device disposed between the at least one door and the outer cowling and arranged to oppose a flow of air on a perimeter of the at least one door and through the at least one opening when the at least one door is in the closed position.

6. The nacelle according to claim 1, wherein at least one of the at least one door and the outer cowling further comprises at least one fixed or movable lateral flap proximate the at least one opening.

7. The nacelle according to claim 1, wherein the upstream section of the outer cowling and the continuous downstream end portion of the ejection nozzle are made as a single piece.

8. The nacelle according to claim 1 further comprising a thrust reverser device.

9. The nacelle according to claim 1, wherein the at least one door is acoustically treated.

* * * * *